(12) United States Patent
Ganesh et al.

(10) Patent No.: US 6,961,865 B1
(45) Date of Patent: Nov. 1, 2005

(54) TECHNIQUES FOR RESUMING A TRANSACTION AFTER AN ERROR

(75) Inventors: Amit Ganesh, San Jose, CA (US); Ekrem Soylemez, Arlington, MA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

(21) Appl. No.: 09/993,855

(22) Filed: Nov. 13, 2001

Related U.S. Application Data

(60) Provisional application No. 60/293,844, filed on May 24, 2001.

(51) Int. Cl.[7] .............................................. G06R 11/00
(52) U.S. Cl. .............................. 714/2; 714/15; 714/19; 707/202
(58) Field of Search ................................ 714/2, 15, 19, 714/14; 707/202; 718/101, 104

(56) References Cited

U.S. PATENT DOCUMENTS

| | | | |
|---|---|---|---|
| 5,269,017 A * | 12/1993 | Hayden et al. ............... | 714/15 |
| 6,493,826 B1 * | 12/2002 | Schofield et al. ........... | 713/200 |
| 6,523,134 B2 * | 2/2003 | Korenshtein ................. | 714/16 |
| 6,594,779 B1 * | 7/2003 | Chandra et al. .............. | 714/15 |
| 6,594,781 B1 * | 7/2003 | Komasaka et al. ........... | 714/19 |
| 6,643,797 B1 * | 11/2003 | Horowitz ..................... | 714/20 |
| 6,697,901 B1 * | 2/2004 | Shun Chan ................. | 710/200 |
| 2002/0178395 A1 * | 11/2002 | Chen et al. ................... | 714/2 |

* cited by examiner

*Primary Examiner*—Nadeem Iqbal
*Assistant Examiner*—Yolanda L Wilson
(74) *Attorney, Agent, or Firm*—Hickman Palermo Truong & Becker, LLP

(57) ABSTRACT

Techniques for executing an atomic transaction include performing a first operation of a first set of operations. The atomic transaction involves the first set of operations for causing changes to a first set of data. A first error that prevents completion of the atomic transaction is detected. In response to detecting the first error, a second set of operations is performed for resolving the first error. It is then determined whether a resolution of the first error is obtained in response to performing the second set of operations. If the resolution is obtained, then execution of the first set of operations is resumed. These techniques allow atomic transactions to be resumed after resolving an error without undoing all the operations accomplished for the transaction at the time the error occurred.

43 Claims, 8 Drawing Sheets

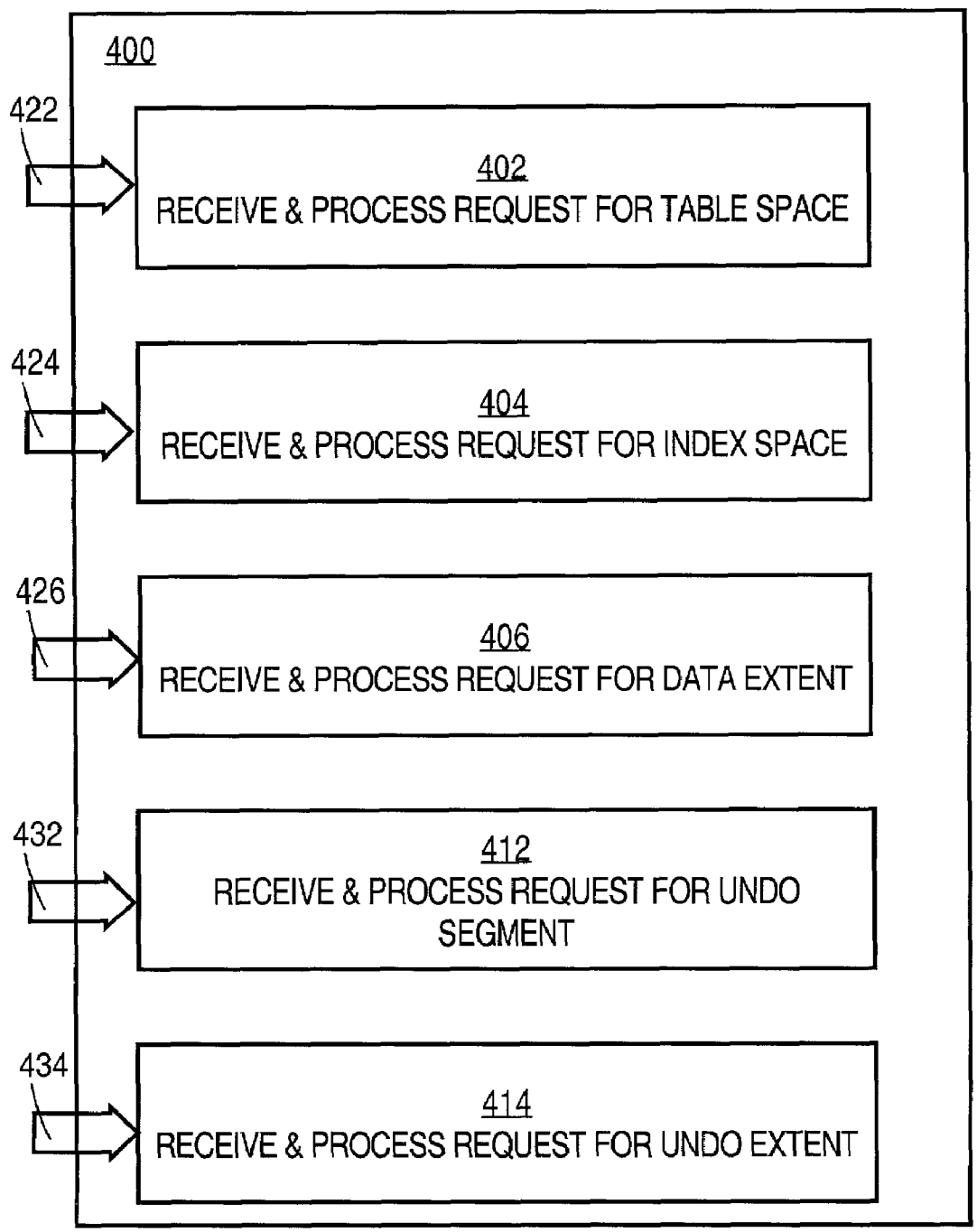

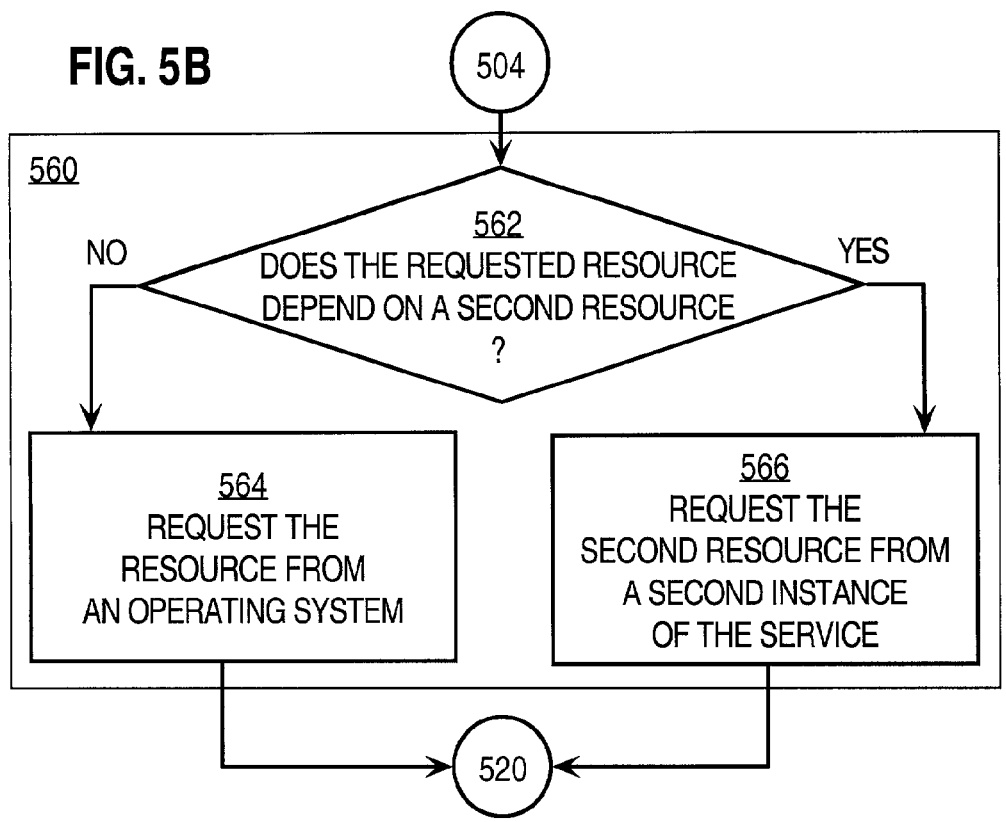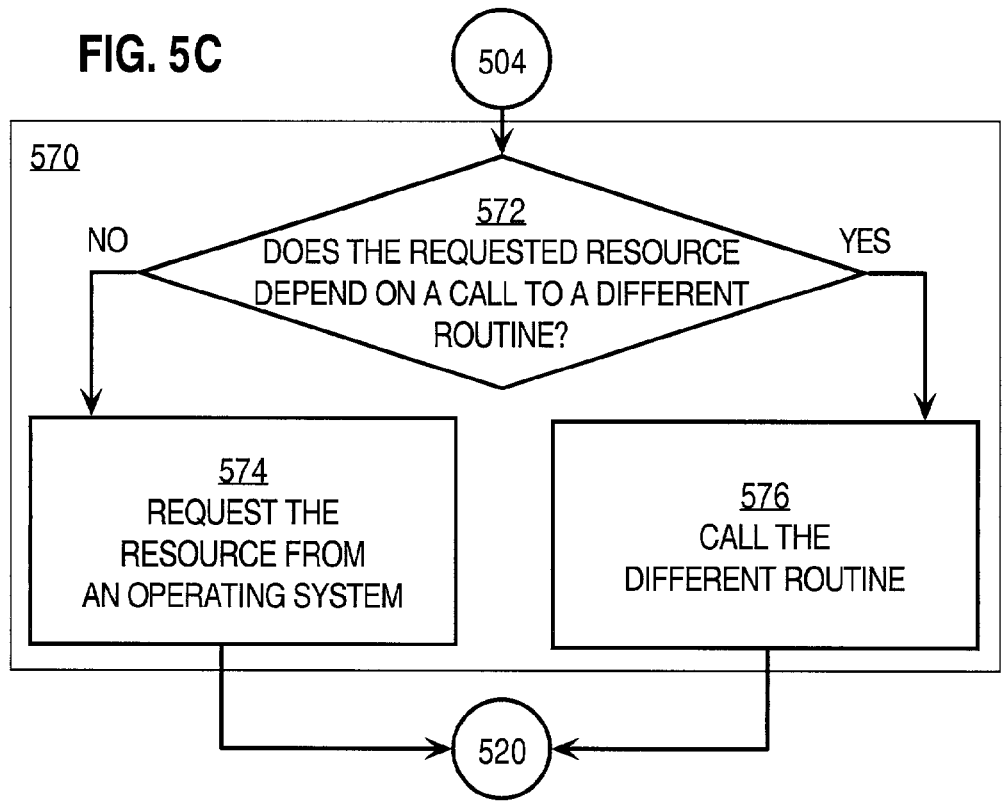

US 6,961,865 B1

TECHNIQUES FOR RESUMING A TRANSACTION AFTER AN ERROR

RELATED APPLICATION; PRIORITY CLAIM

This application is related to and claims domestic priority under 35 U.S.C. § 119(e) from prior application Ser. No. 60/293,844, filed May 24, 2001, entitled "Techniques for Resuming a Transaction after an Error," and naming as inventors Amit Ganesh, Ekrem Soylemez, and Benoit Dageville, the entire disclosure of which is hereby incorporated by reference as if fully set forth herein.

FIELD OF THE INVENTION

The present invention relates to performing atomic transactions in a computer system; and more particularly to performing atomic transactions that resume execution after resolving a resolvable error at a stage where the error is encountered.

BACKGROUND OF THE INVENTION

A software system is a set of software instructions that cause a computer system to perform a group of related tasks. Sometimes tasks include one or more atomic transactions. An atomic transaction is a set of operations that change the state of data or equipment controlled by the software system in such a way that either the transaction completes successfully to produce a final changed state, or, if the transaction does not complete successfully, then the data or equipment is returned to its original state before the transaction was started. If the power fails or a component dies during the transaction, the transaction is not completed, and interim changes associated with the transaction have to be undone, also said to be "rolled back." To provide this "undo" or "rollback" functionality, data indicating one or more reverse operations for each operation involved in the atomic transaction are accumulated in a special, "undo" data structure.

As computer systems are employed to tackle ever-larger tasks, the number of simple operations involved in an atomic transaction and the time required to perform the atomic transaction can become substantial and economically significant. For example, an atomic transaction to update the software controlling a facility involving thousands of components each having thousands of attributes or functions, can involve tens of millions of operations and take hours of time. As another example, an atomic transaction to add sales data from thousands of outlets of a major retailer to a central database at the end of each business week can involve tens of millions of database table update operations that take hours of time to complete.

If such a large transaction does not complete successfully, hours of time are lost. Not only are the hours of operations lost up to the point of failure, but also a commensurate number of additional hours are lost as the interim changes are undone. For example, the weekly update for the retailer's central database may take four hours, and the transaction may fail after three and a half hours because the power fails. Then the problem has to be resolved, e.g., the power restored; and the interim changes are undone for the next 3.5 hours; and then the transaction is restarted. Even if the power is restored in a few minutes and the transaction completes successfully the second time, the example weekly update is not completed until more than eleven hours after the start. An extra seven hours are consumed due to a power failure of a few minutes.

Sometimes the errors that cause the transaction to fail before completion involve less dramatic problems, such as temporary resource shortages, that often are not even apparent to a user of the system. For example, in some database software systems, a database administrator must configure the software system to reserve total storage space on the computer system for the data indicating the undo operations, and to reserve storage space individually for segments of storage space for each concurrent transaction. If the database administrator has underestimated the number of transactions attempted concurrently, or the number of operations involved in each transaction, or both, then the reserved storage space might become insufficient to accommodate all the concurrent transactions through to completion. A "disk full" error is encountered. One or more of the transactions may fail before completion, even though adequate undo storage space becomes available after a few minutes, when one of the other transactions completes. The failed transactions are then undone, and subsequently restarted, such as when more undo storage space becomes available. Hours of time are consumed to perform the undo operations and then repeat the transaction operations already performed, even if the additional undo storage space becomes available in a few minutes.

Based on the foregoing, techniques are clearly needed for providing atomic transactions that can be resumed after resolving an error without undoing all the operations accomplished at the time the error occurred.

SUMMARY OF THE INVENTION

Techniques are provided for executing an atomic transaction that involves a first set of operations that causes changes to a first set of data. According to one aspect of the invention, the techniques include performing a first operation of the first set of operations associated with the atomic transaction and detecting a first error that prevents completion of the atomic transaction. In response to detecting the first error, a second set of operations is performed for resolving the first error. It is then determined whether a resolution of the first error is obtained in response to performing the second set of operations. If the resolution is obtained, then execution of the first set of operations is resumed.

According to an embodiment of this aspect, the techniques include determining whether the first error is a member of a predetermined set of errors for which corrective action is available for allowing the atomic transaction to be completed. The second set of operations is initiated upon determining that the first error is a member of the predetermined set of errors.

According to another aspect of the invention, techniques for handling a call that requests a resource in a computer system include receiving the call at a first instance of a service. In response to the call, data that indicates a first pending request for a first resource is added to a data structure. The first resource is requested. It is determined whether a first error occurs while requesting the first resource. If the first error occurs, then it is determined whether data indicating a second pending request for a second resource precedes the data indicating the first pending request in the data structure. If the data indicating the second pending request precedes the data indicating the first pending request, then the first instance of the service responds to the call with data indicating the first error.

According to an embodiment of this aspect, requesting the first resource includes determining whether providing the first resource depends upon obtaining a second resource. If providing the first resource depends upon obtaining the second resource, then a second instance of the service is called to provide the second resource.

According to an embodiment of this aspect, if no data indicating the second pending request precedes the data indicating the first pending request, then a set of operations are performed for resolving the first error. It is then determined whether a resolution of the first error is obtained in response to performing the set of operations. If the resolution is obtained, then the first instance responds to the call with data indicating a reference for the first resource.

According to an embodiment of this aspect, the data indicating the first pending request is removed from the data structure before returning control to a routine that made the call to the first instance of the service.

According to another aspect of the invention, techniques for executing an atomic transaction that involves a first set of operations that causes changes to a first set of data, include performing a first operation of the first set of operations associated with the atomic transaction. While performing the first operation, a first error is detected, which prevents completion of the first set of operations. It is determined whether the first error is a member of a predetermined set of errors for which corrective action is available for allowing the atomic transaction to be completed. If it is determined that the first error is a member of the predetermined set of errors, a second set of operations are performed for resolving the first error. The second set of operations include releasing all locks held on all resources as a result of the first operation, and suspending execution of remaining operations of the first set of operations. It is determined whether a resolution of the first error is obtained within a particular time period in response to performing the second set of operations. If the resolution is obtained, then execution of the first set of operations is resumed. If the resolution is not obtained within the particular time period, then a third set of operations are performed to remove all changes made by the atomic transaction to the first set of data.

These techniques allow atomic transactions to be resumed after resolving an error without undoing all the operations accomplished for the transaction at the time the error occurred.

Some of these techniques allow a service to be called recursively for obtaining a resource. A transaction can be resumed after resolving an error due to an unavailable resource. The service attempts to resolve errors in obtaining the resource at the outermost call before returning an error to the calling routine that may cause an atomic transaction to fail.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flowchart showing several entry points for a service to recursively provide resources, which service implements a method for suspending and resuming a transaction according to one embodiment;

FIG. 5B is a flow chart illustrating details of a step of the method shown in FIG. 5A according to one embodiment;

FIG. 5C is a flow chart illustrating details of a step of the method shown in FIG. 5A according to another embodiment;

DETAILED DESCRIPTION OF THE PREFERRED EMBODIMENT

A method and computer readable medium for resuming operations of a transaction are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Figure 1:
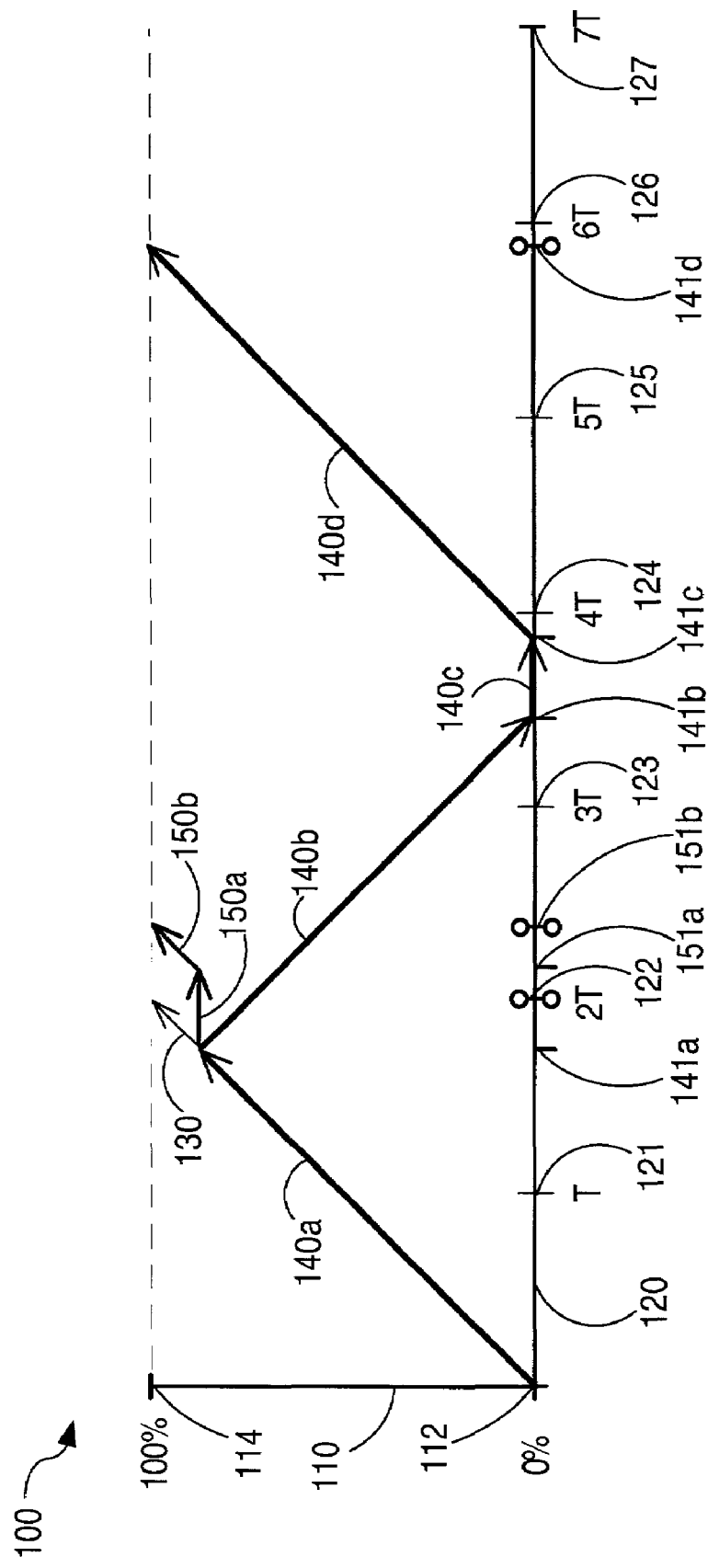
FIG. 1 is a graph showing percent completion of a transaction with time according to one embodiment.

FIG. 1 is a graph showing percent completion of a hypothetical, example atomic transaction with time according to one embodiment. The vertical axis 110 represents percent completion of changes in state of data or equipment based on an atomic transaction. The axis 110 extends from 0% complete at coordinate 112 on the axis 110, to 100% complete at coordinate 114 on the axis 110. The horizontal axis 120 represents elapsed time from start of a transaction at time coordinate 140 in arbitrary units T of time. One arbitrary unit T of time has elapsed at coordinate 121, two at coordinate 122, as indicated by the symbol 2T, through increasing multiples of T of elapsed time at coordinates 123, 124, 125, 126 to an elapsed time of 7T at coordinate 127.

Arrow 140a graphs progress from the start at zero elapsed time, at coordinate 140, to a time at coordinate 141a at which an error is encountered. At this time the changes in state of the data or equipment has reached a stage of almost, but less than, 100% completion. According to conventional methods of executing an atomic transaction, the changes in state of the data or equipment are undone to restore the state of the data or equipment at the start of the transaction, e.g., at 0% change.

Arrow 140b graphs progress during such undoing or rolling back. In this example, the rolling back progresses at the same rate as the initial changes in state, and the data or equipment are restored to their original state at the elapsed time corresponding to coordinate 141b.

Arrow 140c represents time spent eliminating the problem that caused the error. No change is made to the state of the data or equipment, so the arrow 140c is horizontal. For example, arrow 140c represents the time spent obtaining resources to allow the transaction to complete. Arrow 140c extends from elapsed time at coordinate 141b to elapsed time at coordinate 141c.

Arrow 140*d* represents progress made after the problem leading to the error is eliminated and the transaction is restarted. In this example no further errors are encountered and the data or equipment are completely changed to the new state at the time represented by the barbell symbol at time coordinate 141*d*. In some circumstances, the resources may already be available by the time the changes are rolled back, so that arrow 140*c* may be eliminated, and the total time to complete the transaction may be shorted by the length of arrow 140*c*.

Arrow 130 represents progress made if the transaction had not encountered the error after arrow 140*a*. In this case, the transaction completes at an elapsed time of 2T represented by the barbell at coordinate 122. As can be seen in this example by comparing the barbell at coordinate 122, representing an elapsed time of 2T, with the barbell at coordinate 141*d*, representing an elapsed time of almost 6T, an error encountered before completing this example atomic transaction causes the transaction to take almost three times as long to complete as the same transaction with no error, an increase of almost 200%.

According to the present invention, when the error is encountered at the end of arrow 140*a*, the transaction is suspended while the error is resolved, represented by arrow 150*a*. No progress is made in changing the state of the data or equipment, but neither is any change in state undone or rolled back. Therefore, the arrow 150*a* is horizontal. When the error is resolved at the end of arrow 150*a*, at an elapsed time represented by coordinate 151*a*, the transaction is resumed, as represented by arrow 150*b*. In this case the transaction completes at an elapsed time represented by the barbell at coordinate 151*b*.

As can be seen in this example by comparing the barbell at coordinate 122, representing an elapsed time of 2T, with the barbell at coordinate 151*b*, representing an elapsed time of less than 2.5T, an error encountered before completing this example atomic transaction causes the transaction to take only about 25% more time to complete than the same transaction with no error. The present invention therefore provides a substantial improvement in this example compared to the convention atomic transaction, which consumes 200% more time to complete than the same transaction with no error.

A FIRST EMBODIMENT

Figure 2:
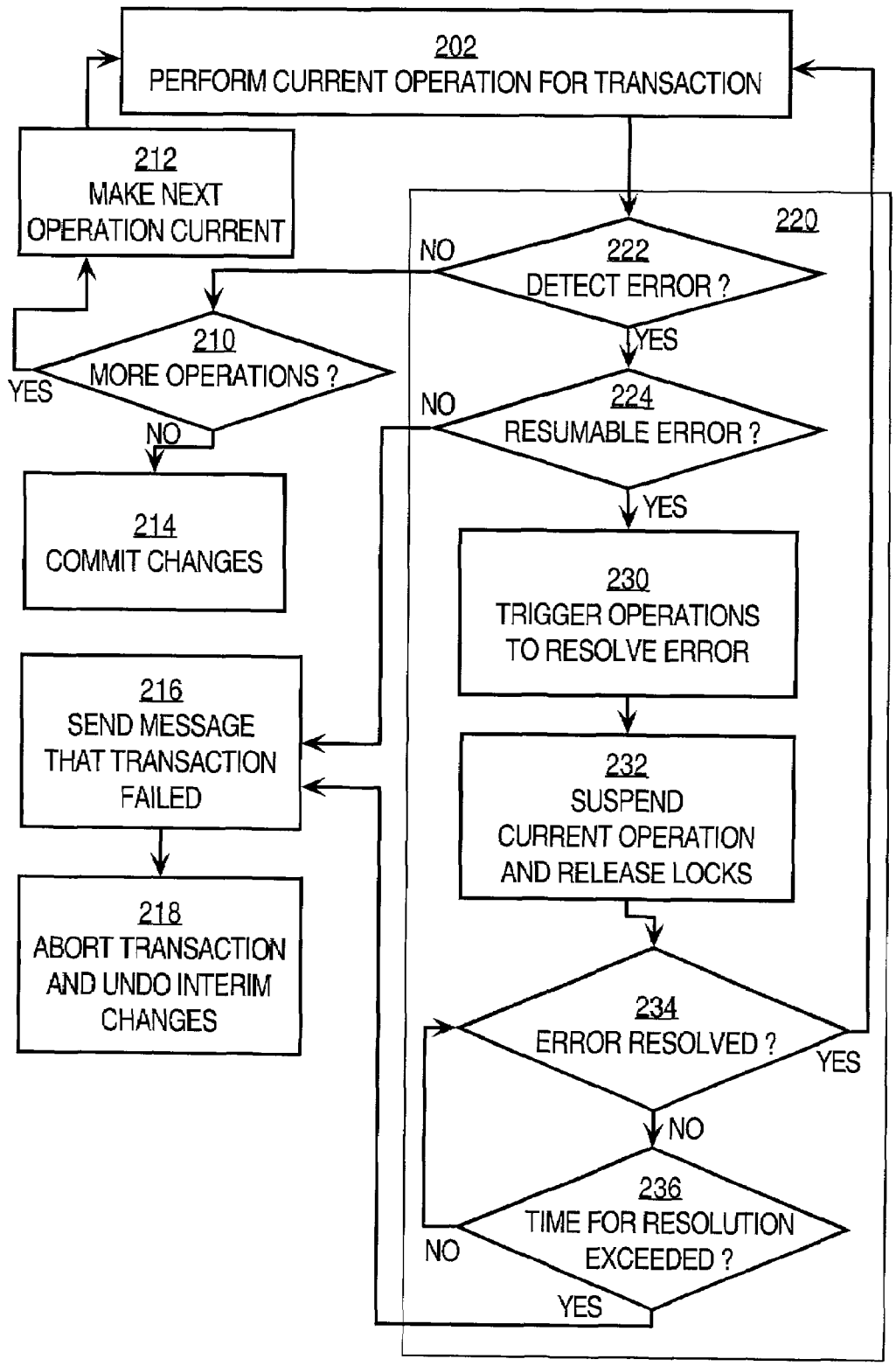
FIG. 2 is a flowchart illustrating a method for suspending and resuming a transaction according to one embodiment.

FIG. 2 is a flowchart illustrating a method for suspending and resuming a transaction according to a first embodiment. The transaction is one entity of multiple entities that constitute a software system. The method may be implemented in any manner known in the art. For example, in some embodiments, the method is implemented as a subroutine of instructions that are part of an entity having instructions to perform many different tasks of the software system. In other embodiments, for example, the method is a separate process running in a multiprocessing system, which communicates with other entities of the software system by means of messages. In still other embodiments, for example, the method is implemented as one or more modules in a library of modules that are separately linked and loaded dynamically at runtime when each module is invoked.

In step 202, a current operation included in a transaction is performed. The transaction includes multiple simple operations. For example, a transaction to perform a database bulk load for a relational database includes multiple operations corresponding to reading data from one or more data sources, adding rows in one or more tables of the database, deleting obsolete rows in one or more tables, or updating multiple rows in one or more tables, or any combination of these actions. Adding more rows than are deleted may cause a database software system that manages the relational database to add persistent storage space for a table in the form of one or more extensions to files, the extensions sometimes called extents. Tables are persistently stored in one or more files, each file including one or more extents. Each extent includes one or more blocks of storage. A block of storage herein means a fundamental unit of storage used by a persistent storage device for retrieving data from a persistent storage medium or storing data into the persistent storage medium. Data are not retrieved or stored from the persistent storage medium in units smaller than a block.

In step 222 it is determined whether an error is detected. Errors are often generated by an operating system of the computer system on which the software system is executing and communicated to the software system. Other errors are generated by the software system itself.

Errors can be detected in several ways known in the art. For example, an error can be indicated as a value held in a particular variable called a flag. One value for the flag indicates an error has occurred, another value indicates a different error or no error. Flow in the instruction set implementing the method depends on the value of this flag. For another example, an error code can be returned as a parameter of a function called to perform the operation. In an alternative example, the error can be thrown as an exception. An exception is a particular type of software system event, which causes the software system to pass control to an exception handling method identified when the system is configured. Similarly, the error can be generated as an event, which causes the software system to pass control to an event handling method identified when the system is configured. The error is detected in the exception handling method or the event handling method invoked by the software system.

If no error is detected in step 222, then control passes to step 210 to determine whether any more operations remain to be performed to complete the transaction. If it is determined in step 210 that no more operations remain for the transaction, then control passes to step 214 to commit the changes. After the changes are committed, the data indicating how to undo the changes may be deleted, and the space devoted to storing the undo information may be reused by other entities of the computer system, such as other transactions.

However, if it is determined in step 210 that more operations remain to be performed to complete the transaction, then control passes to step 212 to make the next operation the current operation of the transaction. Then control passes back to step 202 to perform the new current operation.

In the conventional atomic transaction, if an error is detected in step 222, then control passes to step 216 to indicate to a user of the software system that the transaction failed. Control then passes to step 218 to abort the transaction and to undo the interim changes to the state of the data or equipment, as described above with respect to arrow 140*b* in FIG. 1.

According to the embodiment of the invention illustrated in FIG. 2, instead of passing control to step 216 when an error is detected, it is first determined in step 224 whether the error is one that may allow the transaction to be resumed if the error or the circumstances leading to the error can be resolved. An error that may allow the transaction to be resumed if the error or the circumstances leading to the error can be resolved is herein called a resumable error.

Certain errors might not allow the transaction to be resumed after resolving the error. The types of errors that fall into this category will vary from implementation to implementation, but may include, for example, disk errors. Other errors allow the transaction to be resumed after resolving the error.

As an example of resumable errors, some database software systems produce an error if a transaction requests more resources than have been reserved for the software system. These resources include data space persistent storage used to store new tables and new rows in existing tables and new indexes and new entries into existing indexes. These resources also include undo space persistent storage used to store data indicating the instructions to reverse interim changes made to a database table as part of a transaction. These resources also include sort space persistent storage used to sort data to form indexes or to sort or group results of a query. These resources also include space in memory used to temporarily cache data from a table, to sort data, or to hold data indicating the state of operation for each thread of multiple threads sharing a single processor. These resources also include bandwidth on communications channels used to send data among several processors for distributed processing or to send data to client processes of the software system. In an example database software system, the amount of these resources to be used during operations is established during configuration of the software system. This allows an administrator to estimate how many software systems can reasonably share the components of a computer system.

If the transaction requests a greater amount of one of these resources than the system has been configured to provide, then the software system issues an error. No changes are made to the state of data in the database as a result of this error. The error might be resolved by reallocating space among the configured amounts, for example, re-allocating persistent storage already reserved, and paid for, from undo space to data space, or simply reserving, and paying for, additional data space. Such changes may require human intervention. Sometimes, the error can be resolved simply by waiting. For example, after one transaction completes and commits its changes, its undo space may be used by another transaction. Thus an error caused by a lack of undo space can be resolved simply by suspending the transaction until another concurrent transaction completes, and automatically resuming the transaction without any human intervention after the other transaction completes.

According to the present invention, actions are taken to allow the error to be resolved and the transaction to be resumed when a resumable error is encountered, rather than undoing all the interim changes already made to the state of the data or equipment. In step 224, it is determined whether the error encountered is a member of a set of resumable errors. The set of resumable errors is defined before the software system is executed, such as during configuration of the software system. For example, the resumable errors are listed in the instructions that cause the processor to perform the transactions. In another example, the resumable errors are stored in a data structure that is referenced when an error is encountered. If it is determined that the error is not a member of the predetermined set of resumable errors, then control passes to step 216 to warn the user, and also to step 218 to abort the transaction, as in the conventional execution of an atomic transaction.

If it is determined in step 224 that the error encountered is a member of the set of resumable errors, then control passes to step 230 to trigger operations to resolve the error. In one embodiment the trigger issues an event that induces the software system to invoke an event handling method to perform the operations to resolve the error. In other embodiments, the trigger simply calls a routine or subroutine to perform the operations to resolve the error.

If human intervention is involved in resolving the error, then the operations include inviting human intervention, such as by notifying a human operator of the intervention desired. In one embodiment, an e-mail message is sent to an address for the human operator. In another embodiment, a telephone number is dialed to activate a beeper assigned to the human operator. In yet another embodiment, a telephone number assigned to the human operator is dialed and a message is played indicating the intervention desired. In other embodiments, some combination of these invitations for human intervention is employed.

If the error is related to a lack of resources, then resolving the error includes a request for additional resources. This may involve the intervention of a human operator, e.g., to mount another disk, or may be automatic, such as reconfiguring the system to allocate the additional resource, or may simply require waiting for a reasonable period of time for the desired resources to become available, e.g., for undo space to become free as a result of a different transaction committing its changes.

In the depicted embodiment, the operations to resolve the error include operations in step 232 to suspend execution of the current operation and release locks on resources held by the transaction. This can be done in any manner known in the art. For example, a call to a subroutine may cause the operation of the calling routine to be suspended until the subroutine is completed. In another example, thread swapping actions by the operating system are employed to suspend execution of the current operation of the transaction, as described next.

On many computer systems an operating system is multi-threaded, which allows multiple processes to be run by a single processor of the computer system. One or more threads of related operations are generated for each process. When an operation on one thread is started that requires some time to complete, such as waiting for a response from another device, the processor does not remain idle. Instead, the operating system saves to main memory the state of the related operations, as recorded in portions of processor memory called a stack and a heap, and replaces the information in the stack and heap with values of another thread saved in main memory. The processor is said to swap threads with main memory. After performing one or more operations from the new thread, the processor again swaps threads with main memory to execute one or more operations of a different thread or the original thread. Rules for swapping threads are designed to make best use of the processor and share the processor equitably among the several threads. In many operating systems, the processor can be instructed to swap out a first thread until a second thread authorizes the processor to resume the first thread.

In one embodiment of step 232, the transaction is suspending by issuing an instruction to swap out the current thread for the transaction until a second thread authorizes the processor to resume the current thread. In this embodiment, the second thread of operations includes operations to determine whether the error has been resolved, as described later with respect to steps 234 and 236.

In another embodiment of the invention, step 232 is executed before step 230. In this other embodiment, the second thread of operations includes the trigger for operations to resolve the error, such as requesting additional resources, waiting, and inviting human intervention.

Step 232 also includes releasing locks on resources held as a result of the current operation of the transaction. There are benefits to releasing locks on resources held by the current operation of the transaction before suspending the current thread. One benefit is that other processes seeking the same resources may be allowed to proceed during the suspension of the current operation of the transaction. Another benefit is that the amount of data in the heap and stack that must be swapped with main memory is reduced. An example of releasing locks is described in more detail later.

In step 234 it is determined whether the error is resolved. This can be performed in any manner known in the art.

In one embodiment, the operations to resolve the error triggered in step 230 include polling to determine if the same error results. For example, if the error is that there is insufficient disk space for the suspended operation, then the software system or operating system is periodically requested to report the amount of available disk space. The period is selected to be small enough to keep the suspension time short and large enough to prevent consuming too many system resources by too-frequent requests. For example, a period of about one minute is appropriate in many circumstances. The amount available is compared to the amount desired. When the amount available exceeds the amount desired, then the error is considered resolved. Alternatively, the system is periodically requested for a certain amount of disk space. When the system does not return a "disk full" error, then the error is considered resolved.

In another embodiment, the step 234 is performed by an event handler invoked by the software system when a certain condition, such as a "disk full" error, occurs. In this embodiment, the software system provides a return trigger. Several error resolving events to be issued by the software system and corresponding event handlers are defined at the time of software system configuration, in this embodiment.

If it is determined that the error has not been resolved in step 234, then control passes to step 236 to determine whether a predetermined time for obtaining resolution of the error has been exceeded. This step prevents a transaction from being suspended indefinitely. The predetermined time is established at the time of software system configuration in this embodiment. The predetermined time is selected to be long enough to allow an error to be resolved, for example, to provide ample time to add a disk or reconfigure the software system. However, the predetermined time is selected to be short enough so that it does not cause greater delays than undoing the transaction and starting over. In some circumstances a predetermined time of about an hour provides an appropriate balance.

In one embodiment in which error resolution is determined based on a return trigger, this step is implemented by launching an "out-of-time" return trigger as part of the operations to resolve the error. The "out-of-time" return trigger sends an "out-of-time" event upon the passage of the predetermined time. If an error resolved event is sent before the "out-of-time" event, then the error is resolved in time.

If it is determined that the time since the error was encountered does not exceed the predetermined time, then control passes back to step 234 to again determine whether the error is resolved. If, however, the time since the error was encountered does exceed the predetermined time, control passes to step 216 to warn the user that the transaction has failed, and also passes to step 218 to abort the transaction and undo the interim changes.

If it is determined in step 234 that the error has been resolved, then control passes back to step 202 to perform the current operation of the transaction. Upon resumption in the depicted embodiment, the current operation does not own locks for any resources, because the locks were released in step 232. Therefore the current operation requests locks for any resources desired and proceeds when the desired locks are obtained. Because the error is resolved, it is likely that no error is detected in step 222 after resuming performance of the current operation in step 202, and control will likely pass to step 210 to determine whether any more operations remain to be performed for the transaction.

In the embodiment in which the current operation is suspended by means of a second thread withholding authorization to resume a first thread, then control is passed to step 202 by providing the authorization for the operating system to resume the first thread.

These techniques allow atomic transactions to be resumed after resolving an error of a predetermined set of errors without undoing all the operations accomplished for the transaction at the time the error was encountered.

RESOURCE SERVICE EMBODIMENT

In one embodiment all errors resulting from requests for resources are considered resumable errors. In this embodiment, all requests for resources are directed to a resource service 220 of the software system instead of to an operating system. The resource service 220 performs the steps 222, 230, 232, 234, 236.

In this embodiment, step 224 is optional because the call to the service automatically indicates that a resource request is involved and all errors resulting from resource requests are considered resumable errors.

In this embodiment, the resource service 220 requests the resource from the operating system and determines whether the operating system returns an error in step 222. In some embodiments, the resource service 220 also calls conventional application level routines that each either provide a resource or issue an error if the resource can not be provided.

If the resource service 220 cannot obtain resolution of the error within the predetermined time, the resource service 220 returns an error to the routine that called it. The calling routine that called the resource service will respond to an error from the resource service in the conventional manner, e.g., the calling routine causes control to pass to step 216 to indicate that the transaction has failed and also to pass to step 218 to abort the transaction and undo the interim changes.

RECURSIVE RESOURCE REQUESTS

Figure 3:
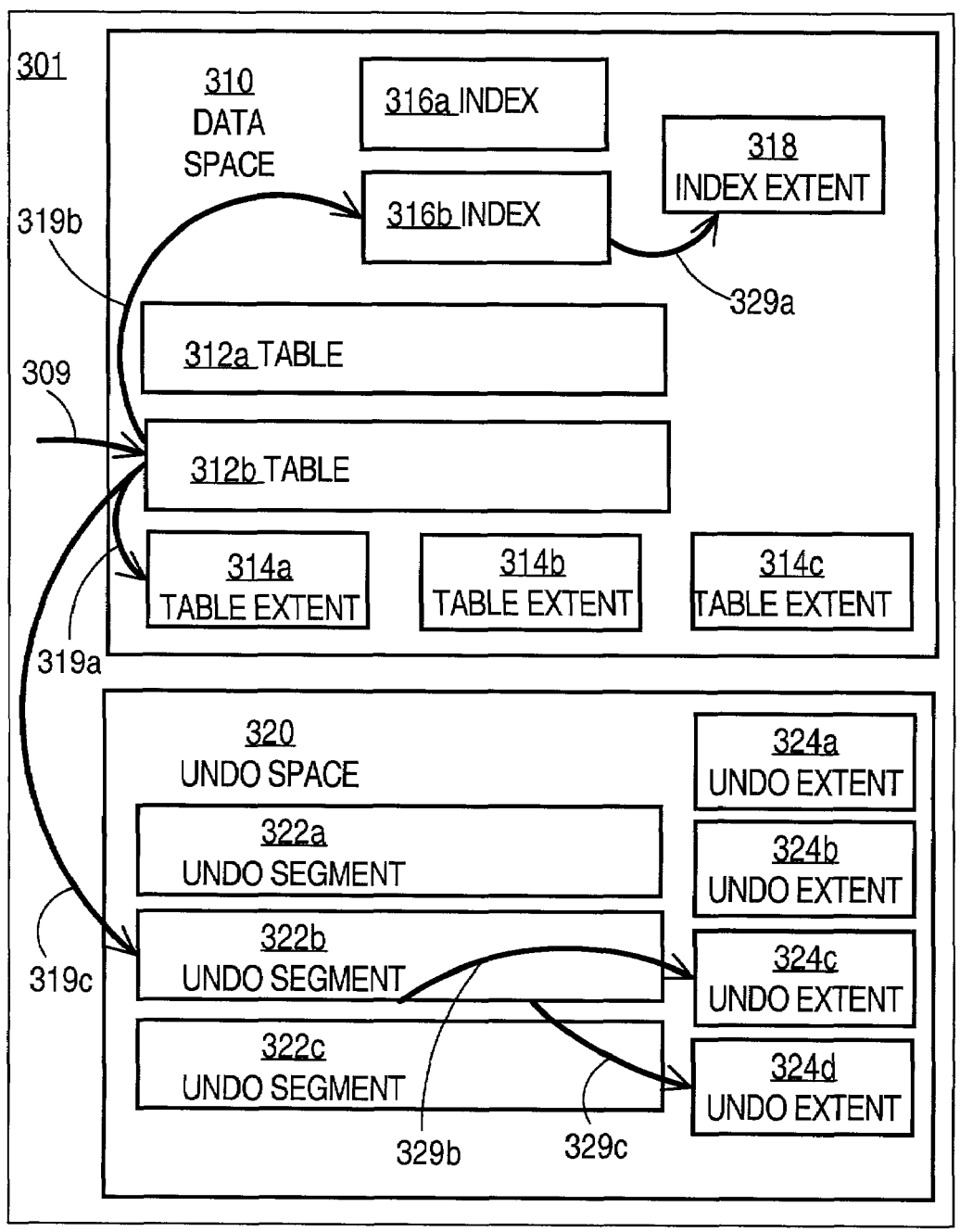
FIG. 3 is a block diagram illustrating recursive requests for resources in a database system that uses one embodiment.

When a resource service 220 is used to implement the techniques of the current invention, the service should be designed to handle recursive requests for resources. FIG. 3 is a block diagram illustrating recursive requests for resources in one embodiment of a database software system. In the embodiment illustrated in FIG. 3, a database software system 301 includes access to a fixed amount of persistent storage space for data space 310 and another fixed amount of persistent storage space for undo space 320.

Data space 310 is utilized by the software system 301 for storing tables 312a, 312b (collectively indicated by reference numeral 312) of data and for storing indexes 316a, 316b (collectively indicated by reference numeral 316). A table 312 includes data in one or more rows, each row comprising data for one or more columns. An index 316 includes information indicating one or more rows in a table 312 where a particular value is found in one of the columns.

As more data are added to a table 312, the amount of the data space 310 allocated to the table may have to be increased. Data space is added to a table in amounts called extents that are extensions to a file of a storage system employed to store a table 312 or index 316. An extent represents one or more blocks of storage added to a file at one time. A block is the smallest amount of data exchanged between main memory and the storage system at one time.

Similarly, as a table 312 grows, the indexes 316 associated with the table may also grow, and additional data space 310 may be added to an index 316 by using other extents. FIG. 3 depicts several extents 314a, 314b, 314c (collectively referenced by numeral 314) available for allocating to one of the tables 312, and depicts an index extent 318 available for allocating to one of the indexes 316.

Undo space 320 is utilized by the software system 301 for storing segments 322a, 322b, 322c (collectively referenced by numeral 322) holding data indicating the operations to perform to undo interim changes to data in the tables 312. Each transaction is associated with one segment 322. For large transactions, the database software system 301 requests a segment 322 large enough to hold all the data indicating the undo operations. On some occasions, the amount of the undo space 320 allocated to a particular segment 322 may be insufficient. In some embodiments, increasing the undo space 320 allocated to a segment 322 involves reconfiguring the software system to define one or more larger segments. In other embodiments, undo space is added to a segment in one or more extents, as needed at runtime. FIG. 3 depicts several extents 324a, 324b, 324c, 324d (collectively referenced by numeral 324) available for allocating to one or more of the segments 322.

A hypothetical example involving recursive requests for a resource is illustrated with respect to FIG. 3. According to the example, while executing database software system 301, a transaction is started to load one million rows of data into a new table 312b. A request is made for resources for a table with 1,000,000 rows. This request is represented in FIG. 3 by arrow 309. The amount of data space 310 initially allocated is represented by table 312b that can accommodate only 700,000 rows, so a second request is made for a table extent 314 big enough to hold at least 300,000 additional rows for table 312b. The second request is depicted in FIG. 3 by arrow 319a. Thus the request arrow 319a for table extent 314a is generated by the request arrow 309 for table 312b.

Also depicted in FIG. 3 are examples of other requests for resources that result from the request for a table with 1,000,000 rows. To support an index for the table, some of the data space 310 is allocated to an index 316b, so a request for data space for an index is generated, as represented by arrow 319b. The amount of data space 310 initially allocated is represented by index 316b that can accommodate only 900,000 rows, so a second request is made for an index extent 318 big enough to hold at least 100,000 additional index entries for index 316b. The second request is depicted in FIG. 3 by arrow 329a. Thus the request arrow 319b for space for an index and the request arrow 329a for an index extent 318 are also generated by the request arrow 309 for table 312b.

To support the undo operations for the transaction that fills the 1,000,000 rows of table 312b, an undo segment is requested as represented by arrow 319c. The amount of undo space 320 initially allocated is represented by undo segment 322b that can accommodate only 500,000 rows of updates to the table 312b, so a second request is made for an undo extent 324c and a third request is made for undo extent 324d to provide enough undo space to hold at least 500,000 additional rows of updates to table 312b. The second request is depicted in FIG. 3 by arrow 329b and the third request by arrow 329c. Thus the request arrows 329b, 329c for undo extents 324c, 324d generated by the request arrow 319c for undo segment 322b, as well as the request arrow 319c itself, are generated by the request arrow 309 for table 312b.

As used herein, a child request (also called an inner request) for a resource is a request generated by another request for a resource; a parent request for a resource generates a child request; and the single parent that is not the child of another request is the root request, also called the outermost request.

As illustrated in the example depicted in FIG. 3, a service to provide resources may be called recursively as a request for one resource leads to requests for one or more additional resources.

RESOURCE SERVICE WITH RECURSIVE REQUESTS

FIG. 4 is a flowchart showing several entry points for an embodiment of a resource service 400 to recursively provide resources, which service implements a method for suspending and resuming a transaction according to one embodiment. Resource service 400 is an embodiment of the resource service 220 depicted in FIG. 2.

Resource service 400 includes step 402 to receive and process a request for space for a table and step 404 to receive and process a request for space for an index. The resource service 400 also includes a step 406 to receive and process a request for a data extent that may be either an index extent or a table extent, as depicted in FIG. 3. Furthermore, the resource service also includes a step 412 to receive and process a request for an undo segment and a step 414 to receive and process a request for an undo extent. In database software systems in which an undo segment cannot be extended, an embodiment of the resource service does not include step 414. Each of the steps 402, 404, 406, 412, 414 illustrated in FIG. 4 can be called separately by a calling routine as indicated by entry points 422, 424, 426, 432, 434, respectively.

The resource service 400 supports recursive requests for resources because the calling routine using entry points 422, 424, 426, 432, 434 is allowed to be another instance of the resource service. For example, a first routine calls the resource service 400 at entry point 402 to request table space for a transaction adding data to a table. An instance of the resource service 400 begins executing to process the request in step 402. During step 402 it is determined that a data extent is needed as a table extent to provide the requested table space. During step 402 another call is made to resource service 400, but this time at entry point 406. A second instance of the resource service 400 begins executing to process the request in step 406.

In some embodiments, the call causing the second instance of the resource service is not made directly by the first instance. For example, during step 402 the first instance of the resource service 400 may call a particular software system routine to determine whether the table already has enough space allocated to accommodate the request and to call for only the number of extents needed if the table does not have enough space. If the particular software system routine determines to request one or more data extents, then the particular software system routine calls the resource service 400 at entry point 426 for step 406 for each extent. Such indirect recursive calls to the request service allow the software system to use existing routines to determine the amount of space needed. With indirect recursive calls, the resource service 400 need not include all the decision-making software already in the existing routines. The existing routines are modified to call the resource service at one of its entry points whenever an actual resource is requested. Calls to the resource service are made in lieu of calls to other more basic routines that actually provide the identified resource. The resource service 400 then includes streamlined instructions directed to handling errors in a way that allows a transaction to be resumed.

METHODS FOR A RECURSIVE REQUEST RESOURCE SERVICE

According to one embodiment, when recursive requests for resources lead to an error, the outermost request (the root request) should be suspended and the inner requests (the child requests) should be aborted. Aborting the inner requests automatically frees up resources for transactions that are not being suspended and reduces the information on the stack and heap that is swapped to main memory when the root request is suspended.

Furthermore, suspending the root request recognizes that in resource allocation, an error is often the result of a lack of resources in the aggregate and is not solved by fixing the problem at the smallest scale. For example, a transaction may require 100 extents to a table and the available data space has only 50 extents available. The data space is short by 50 extents. If the request for an extent is suspended instead of the request for the table space, then a database administrator is invited to increase the data space by one extent. After providing the one extent of extra space and resuming the transaction, the transaction will encounter an error trying to obtain the next extent. The database administrator is then again invited to expand the data space by one extent. This cycle of suspension, invitation, and resumption repeats until the database administrator had been invited 50 times to add data space for one extent. It is clearly preferable to invite the database administrator once to add 50 extents than to invite the administrator 50 times to add one extent.

According to this embodiment, the child requests for resources are aborted and only the root request is suspended. The operations to resolve the error raised by the root request are triggered. For example, the database administrator is invited once to provide sufficient data space for the root request—an invitation satisfied in the example above by adding data space for at least 50 extents.

Figure 5A:
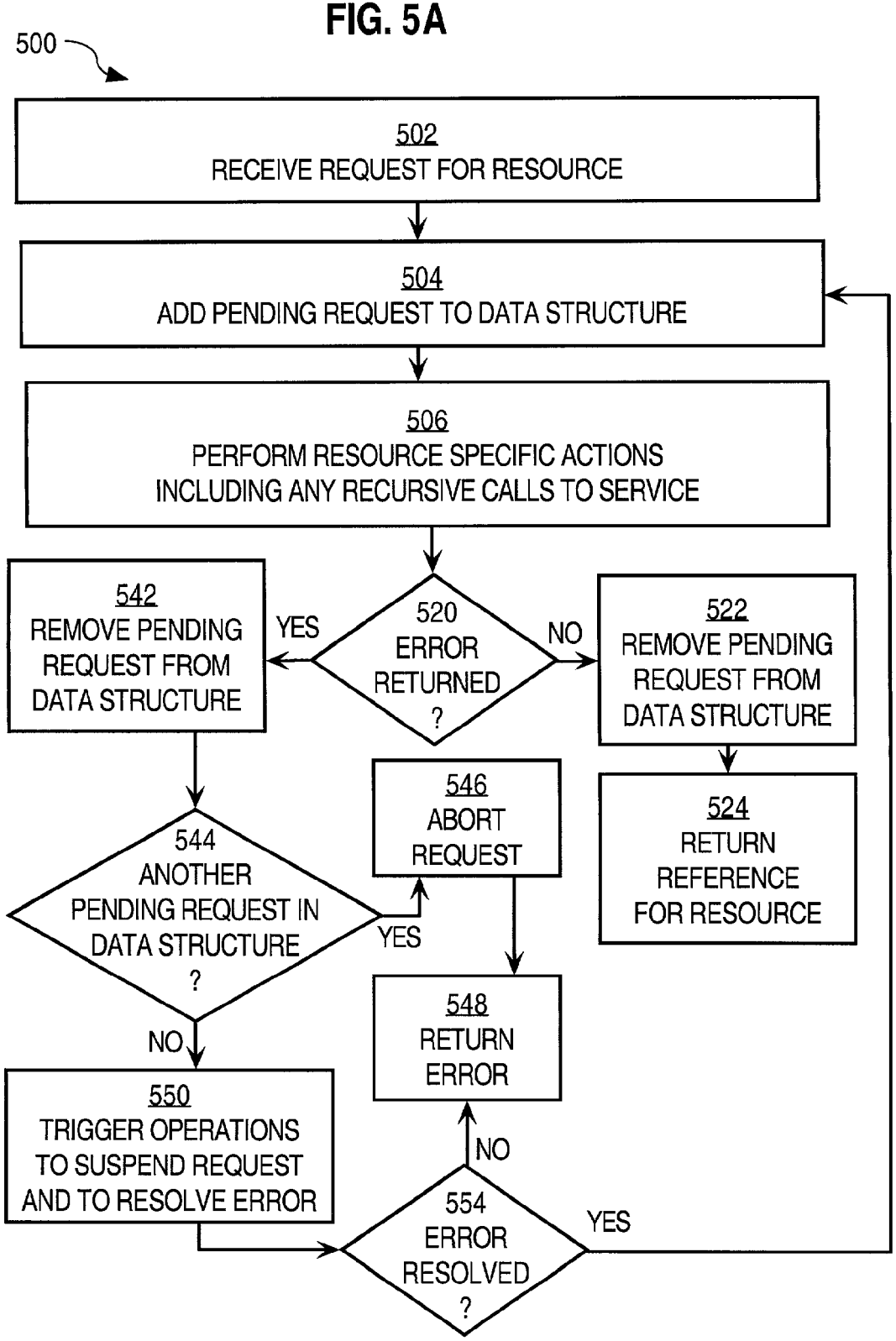
FIG. 5A is a flowchart illustrating a method for suspending and resuming a transaction at each entry point of the service to recursively provide resources according to one embodiment.
Figure 6:
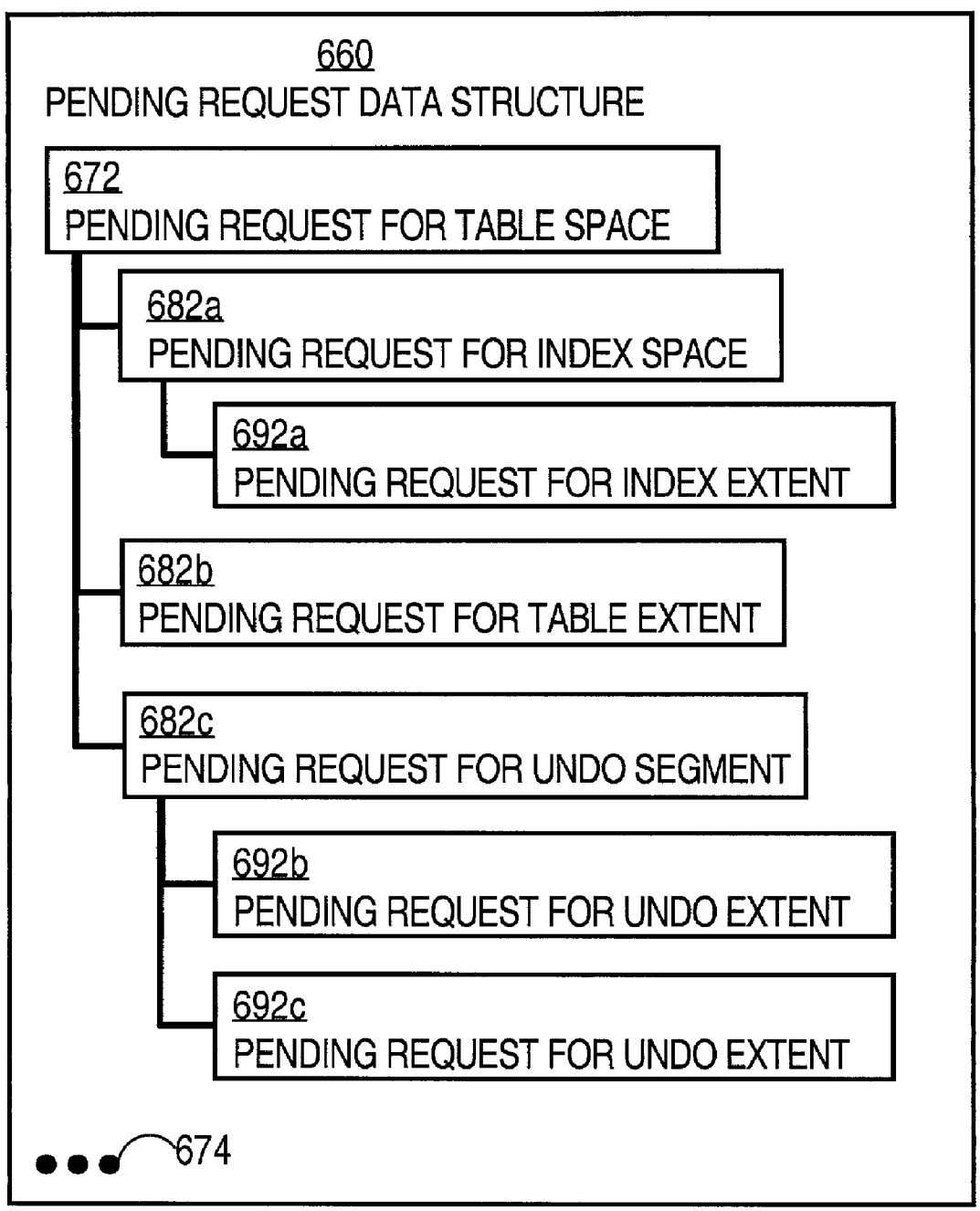
FIG. 6 is a block diagram illustrating a data structure used by the method of FIG. 5A according to one embodiment.

FIG. 5A is a flowchart illustrating a method 500 for suspending and resuming a transaction at each entry point of the resource service 400 to recursively provide resources according to one embodiment. The method 500 uses a data structure, herein called the pending request data structure, to record the context of each request in a hierarchy of parent and child requests for resources. An example data structure 660 is depicted in FIG. 6 and described in more detail below.

In step 502, a request for a resource is received. For example, a request for table space for 1,000,000 rows is received in step 402 of FIG. 4.

In step 504, data indicating the requested resource is added to the pending request data structure. For example, referring to FIG. 6, data indicating a pending request for 1,000,000 rows of table space is added in substructure 672 of pending request data structure 660.

In step 506, specific actions are performed associated with the resource being requested. For example, a call is made to a separate software system routine, herein called routine A, which determines whether the table generated has sufficient space for 1,000,000 rows and routine A calls a separate instance of the resource service 400 if an additional table extent is indicated. In this example, the separate instance of the resource service is indirectly called by the actions of step 506. In another example, step 506 includes steps to determine whether a table extent is also to be requested and then directly calls another instance of the resource service.

FIG. 5B is a flow chart illustrating details for a method 560 of an embodiment of step 506 in which one instance of the resource service 400 directly calls a second instance of the resource service. Step 562 represents a decision point for determining whether the requested resource depends on a second, child resource. If not, then the resource is requested from the operating system in step 564. However, if the requested resource depends on a second, child resource, then a second instance of the resource service is called recursively by the current instance of the resource service in step 566. In either case, control subsequently passes to decision point 520 as described below with respect to FIG. 5A.

FIG. 5C is a flow chart illustrating details for a method 570 of an embodiment of step 506 in which one instance of the resource service 400 indirectly calls a second instance of the resource service. Step 572 represents a decision point for determining whether the requested resource depends on a second, child resource obtained from a call to a different routine of the software system. For example, it is determined whether providing table space requires a call to a routine A to provide space for a table of a given size. If not, then the resource is requested from the operating system in step 564. However, if the requested resource depends on a second, child resource obtained from a call to a different routine, then the different routine is called in step 576. The different routine determines whether to recursively call a second instance of the resource. The recursive call is indirectly due to the steps performed during step 506 by the first instance of the resource service 400. For example, routine A is called in step 576. Routine A then determines whether to recursively call the resource service 400 at entry point 426 to obtain a table extent for the table having 1,000,000 rows. In either case, control subsequently passes to decision point 520 as described below with respect to FIG. 5A.

Step 520 represents a decision point in which it is determined whether an error is returned as a result of actions performed during step 506. For example, it is determined whether routine A is unsuccessful in obtaining the desired table space and returns an error such as by throwing an exception indicating an error. In another example, it is determined whether the separate instance of the resource service returns an error such as by throwing an exception.

If an error is not detected in step 520, then control passes to step 522, which removes the pending request from the data structure. For example, referring to FIG. 6, substructure 672 carrying data indicating the pending request for 1,000,000 rows of table space is deleted from the pending request data structure 660. If this is the earliest or only request stored in the data structure, then the request for table space is a root request. In one embodiment, when the substructure holding the data indicating the root request is deleted, the pending request data structure 660 is also deleted, for example by de-allocating space for the pending request data structure 660.

Control then passes to step 524 to return to the calling routine a reference to the resource. Since no error was detected in obtaining the resource, the resource is made available to the calling program. A resource is typically made available to the calling program by passing a reference to the resource that may be utilized by the calling routine. For example a table name is passed to the calling routine indicating a table that has sufficient space allocated to accommodate 1,000,000 rows.

If an error is detected in step 520, then control passes to step 542, which removes the pending request from the data structure. For example, referring to FIG. 6, substructure 672 carrying data indicating the pending request for 1,000,000 rows of table space is deleted from the pending request data structure 660. If this is the earliest or only request stored in the data structure, the pending request data structure 660 is also deleted. Then control passes to step 544 to determine whether the error is associated with the outermost, root request for resources.

In step 544, the resource service determines whether the error is associated with the root request for resources. This is indicated by the data remaining in the pending resources data structure. If there is no other pending request in the data structure then the pending request is the root request. For example, referring to FIG. 6, only substructure 672 was added in step 504, and substructure 672 was deleted in step 542, leaving no data in pending request data structure 660. Thus it is determined that the request for 1,000,000 rows just deleted from the data structure is the root request.

If no other pending request remains in the data structure then the pending request just removed is the root request and control passes to step 550 to suspend the operation requesting the resource and initiate the series of operations to resolve the error. For example, the request for a table with 1,000,000 rows is suspended and the database administrator is invited to provide data space and undo space sufficient to accommodate a table with 1,000,000 rows.

After step 550, control is passed to step 554 to determine whether the error is resolved as a result of the operations performed during step 550. If the error is resolved, then the request for the resource is resumed by passing control to step 504. Eventually, if no other errors are returned, a reference to the table is returned to the calling routine in step 524. In one embodiment, the step 554 includes the steps 234 and 236 of FIG. 2 to determine whether the error is resolved within the predetermined time for resolving the error.

If it is determined in step 554 that the error was not resolved, then control passes to step 548 to return to the calling routine data indicating the error, such as by throwing an exception. When the calling routine is faced with an error from the resource service from the root request, then control passes to step 216 and 218, as depicted in FIG. 2, for aborting the transaction and undoing the interim changes.

The above describes the method 500 for the case when the root request without child requests succeeds or fails. A root request with child requests succeeds, e.g., no error is detected in step 520, if all the child requests generated from the root request succeed. A root request with child requests fails, e.g., an error is detected in step 520, if even one of the child requests generated from the root request fails.

If it is determined in step 544 that there is another pending request in the data structure, then the pending request just deleted is a child request. An example of the data structure for a child request is given in greater detail later. If the pending request is a child request, control passes to step 546 to abort the pending child request, and to step 548 to return data indicating the error to the calling routine, such as by throwing an exception. The calling routine is another instance of the resource service associated with a parent request, if the current instance of the resource service was called directly. The calling routine is another routine of the software system, such as routine A, if the current request was called indirectly by the parent request. In either case, the error returned in step 548 is detected in step 520 by a different instance of the resource service associated with the parent request, as will be described in more detail below.

According to the method 500, a child request for a resource leading to an error is aborted and only a root request for a resource detecting an error is suspended and triggers operations to resolve the error.

The method 500 is next described in more detail with respect to FIG. 3 and FIG. 6 for an example case in which a root request for a resource generates several generations of child requests before an error is encountered.

EXAMPLE RECURSIVE REQUESTS USING THE RESOURCE SERVICE

In this example, referring to FIG. 3, a root request for a table with 1,000,000 rows, represented by arrow 309, yields an initial table 312b and generates three child requests represented by arrows 319a, 319b, 319c, and three grandchild requests represented by arrows 329a, 329b, 329c, as described above.

Arrow 319a represents a child request for a table extent, such as for table extent 314a. Arrow 319b represents a child request for an index, such as index 316b, for table 312b. Arrow 319c represents a child request for an undo segment, such as undo segment 322b, to store data indicating operations to be employed if the 1,000,000 rows cannot be added successfully in one transaction.

Arrow 329a represents a child request for an index extent, such as index extent 318, generated by the request arrow 319b for index 316b; and thus represent a grandchild request generated by root request arrow 309. Arrow 329b represents a child request for an undo extent, such as undo extent 324c, generated by the request arrow 319c for undo segment 322b; and thus represents a grandchild request generated by root request arrow 309. Arrow 329c represents a child request for a second undo extent, such as undo extent 324d, generated by the request arrow 319c for undo segment 322b; and thus represents another grandchild request generated by root request arrow 309. In embodiments in which undo segments cannot be dynamically extended, requests represented by arrows 329b and 329c are not generated.

In this example, all undo extents 324a, 324b, 324c, 324d are already allocated to undo segment 322a and 322c and are not available for undo segment 322b. An error is generated in response to the requests represented by arrows 329b, 329c for undo extents. It is desired that method 500 suspend the transaction that includes the request represented by arrow 309 until the undo space 320 is increased sufficiently to provide enough undo extents to allow undo segment 322b to accommodate 1,000,000 updates to table 312b.

Referring to FIG. 4, to satisfy the root request represented by arrow 309, a first instance of resource service 400 is called at entry point 422 to initiate step 402 to provide table space for 1,000,000 rows. As shown in FIG. 5A, the request is received at step 502, and in step 504 data indicating a request for 1,000,000 rows of table space is added to the pending resource data structure 660 in substructure 672 shown in FIG. 6. In step 506, a routine A is called to determine what other resources are required, as shown in step 576 of FIG. 5C. In one embodiment, data is passed to routine A indicating the substructure 672 in the data structure 660. Routine A determines to request a table extent, an index and an undo segment.

Routine A calls a second instance of resource service 400 at entry point 424 to initiate step 404 to provide data space for an index for a table with 1,000,000 rows. In one embodiment, the routine A also passes to the second instance the data indicating the substructure 672 in the data structure 660 received from the first instance. As shown in FIG. 5A, the request is received at step 502, and in step 504 data indicating a request for space for an index for a table with 1,000,000 rows is added to the pending resource data structure 660 in substructure 682a shown in FIG. 6. The substructure 682a includes data indicating the substructure 682a is a child request of the request in substructure 672. In other embodiments other means are used to indicate that the request indicated by data in substructure 682a is a child of the request indicated by data in substructure 672.

Routine A also calls a third instance of resource service 400 at entry point 426 to initiate step 406 to provide a table extent. The routine A also passes to the third instance the data indicating the substructure 672 in the data structure 660 received from the first instance. As shown in FIG. 5A, the request is received at step 502, and in step 504 data indicating a request for a table extent is added to the pending resource data structure 660 in substructure 682b shown in FIG. 6. The substructure 682b includes data indicating the substructure 682b is a child request of the request in substructure 672.

Routine A also calls a fourth instance of resource service 400 at entry point 432 to initiate step 412 to provide an undo segment. The routine A also passes to the fourth instance the data indicating the substructure 672 in the data structure 660 received from the first instance. As shown in FIG. 5A, the request is received at step 502, and in step 504 data indicating a request for an undo segment is added to the pending resource data structure 660 in substructure 682c shown in FIG. 6. The substructure 682c includes data indicating the substructure 682b is a child request of the request in substructure 672.

In step 506 of the second instance, a routine B is called to determine what other resources are required to satisfy the request for index space, as shown in step 576 of FIG. 5C. In one embodiment, data is passed by the second instance to routine B indicating the substructure 682a in the data structure 660. Routine B determines to request an index extent. Routine B calls a fifth instance of resource service 400 at entry point 426 to initiate step 406 to provide a data extent. The Routine B also passes to the fifth instance the data indicating the substructure 682a in the data structure 660 received from the second instance. As shown in FIG. 5A, the request is received at step 502, and in step 504 data indicating a request for an index extent is added to the pending resource data structure 660 in substructure 692a shown in FIG. 6. The substructure 692a includes data indicating the substructure 692a is a child request of the request in substructure 682a.

In step 506 of the fourth instance, a routine C is called to determine what other resources are required to satisfy the request for undo segment space, as shown in step 576 of FIG. 5C. In one embodiment, data is passed by the fourth instance to routine C indicating the substructure 682c in the data structure 660.

In this example, routine C determines to request an undo extent. Routine C calls a sixth and a seventh instance of resource service 400 at entry point 434 to initiate step 414 to provide undo extents. The Routine C also passes to the sixth and seventh instances the data indicating the substructure 682c in the data structure 660 received from the fourth instance. As shown in FIG. 5A, the request is received at step 502 of the sixth and seventh instances, and in step 504 of those instances data indicating a request for an undo extent is added to the pending resource data structure 660 in substructures 692b, 692c, respectively, shown in FIG. 6. The substructures 692b, 692c include data indicating the substructures are child requests of the request in substructure 682c.

An error is encountered in step 506 of the sixth instance. In step 506 of the sixth instance, it is determined that no other routine or instance is called, as in step 562 of FIG. 5B and step 572 of FIG. 5C. Instead, a request is made for an undo extent from the operating system, as shown in steps 564 of FIG. 5B and step 574 of FIG. 5C. In this example, the operating system returns an error because no extents are available in the undo space.

The error is detected in step 520 of the sixth instance and control passes to step 542 to remove the pending request for an undo extent represented by substructure 692b from the pending request data structure 660. Control then passes to step 544.

In step 544 it is determined that another pending request precedes the removed request in the data structure. In one embodiment, another request precedes the removed request if the removed request is a child request of the remaining request, as indicated by data stored in the substructure for the removed request. In another embodiment, another request precedes the removed request simply if the remaining request appears in a sequentially written data structure 660 before the removed request. In either embodiment, it is determined in step 544 of the sixth instance that another pending request precedes the removed request in the data structure. This indicates that the request for an undo extent is a child request that is not a root request. Control then passes to step 546.

In step 546, the request for an undo extent is aborted. All locks obtained in response to the request are released. Control then passes to step 548 to return data indicating the error to the calling routine. In this example, the routine C calls the sixth instance, and the fourth instance calls the routine C. The error returned is either passed as data to routine C, which passes the data to the fourth instance, or the exception handler of the fourth instance, represented by steps 520, 542, 544, 546, 548, 550, 554, is invoked upon issuance of the exception by the sixth instance. The error passes directly or indirectly to the fourth instance of the resource service.

The error is detected in step 520 of the fourth instance and control passes to step 542 to remove the pending request for an undo segment represented by substructure 682c from the pending request data structure 660. Control then passes to step 544.

In step 544 it is determined that another pending request precedes the removed request in the data structure. This indicates that the request for an undo segment is a child request that is not a root request. Control then passes to step 546.

In step 546, the request for an undo segment is aborted. All locks obtained in response to the request are released. Control then passes to step 548 to return data indicating the error to the calling routine. In this example, the routine A calls the fourth instance, and the first instance calls the routine A. The error passes directly or indirectly to the first instance of the resource service.

The error is detected in step 520 of the first instance and control passes to step 542 to remove the pending request for table space represented by substructure 672 from the pending request data structure 660. Control then passes to step 544.

In step 544 it is determined that no other pending request precedes the removed request in the data structure. This indicates that the request for table space is a root request. In one embodiment, when the substructure holding the data indicating the root request is deleted, the pending request data structure 660 is also deleted, for example by de-allocating space for the pending request data structure 660. Control then passes to step 550.

In step 550, the locks obtained for the table space are released and the request is suspended. The operations are triggered to resole the error. For example, a database administrator is invited to provide enough data space and undo space for a transaction to update 1,000,000 rows of a table. Control then passes to step 554 to determine if the additional space has been made available in the predetermined time.

If the space is not found within the predetermined time in step 554, control passes to step 548 to return the error to the calling routine. The returned error will cause steps 216 and 218 of FIG. 2 to be performed, aborting the request and undoing the interim changes.

If it is determined in step 554 that the additional space has been made available within the predetermined time, then the request for the 1,000,000 rows of table space is resumed. Control passes to step 504 to add the request for table space for 1,000,000 rows to the pending request data structure. If a pending request data structure does not exist, it will be created. For example, if the pending request data structure 660 was de-allocated in step 542 of the first instance, then in step 504 a new pending request data structure is allocated and the data indicating the request for a table with 1,000,000 rows is added as substructure 672. Control then passes to step 506 to perform the resource specific actions; in this example, the call is made to routine A to determine what other resources to call.

In another example, undo segments are not extended. In this example no request is made resulting in sixth and seventh instances of the resource service. Instead, the error is first detected in the fourth instance when an undo segment of the proper size is requested from the operating system and is not found in the undo space. After the error is detected in the fourth instance, the control follows the path described in the above example.

According to the embodiment described in these examples, when recursive requests for resources lead to an error, the outermost request (the root request) is suspended and the inner requests (the child requests) are aborted. Aborting the inner requests automatically frees up resources for transactions that are not being suspended and reduces the information on the stack and heap that is swapped to main memory when the root request is suspended. Furthermore, suspending and resolving the error in the root request indicates the aggregate problem to be solved and avoids repetitive attempts to resolve multiple errors associated with requests for small amounts of a resource, such as multiple errors in obtaining individual extents of storage space.

HARDWARE OVERVIEW

Figure 7:
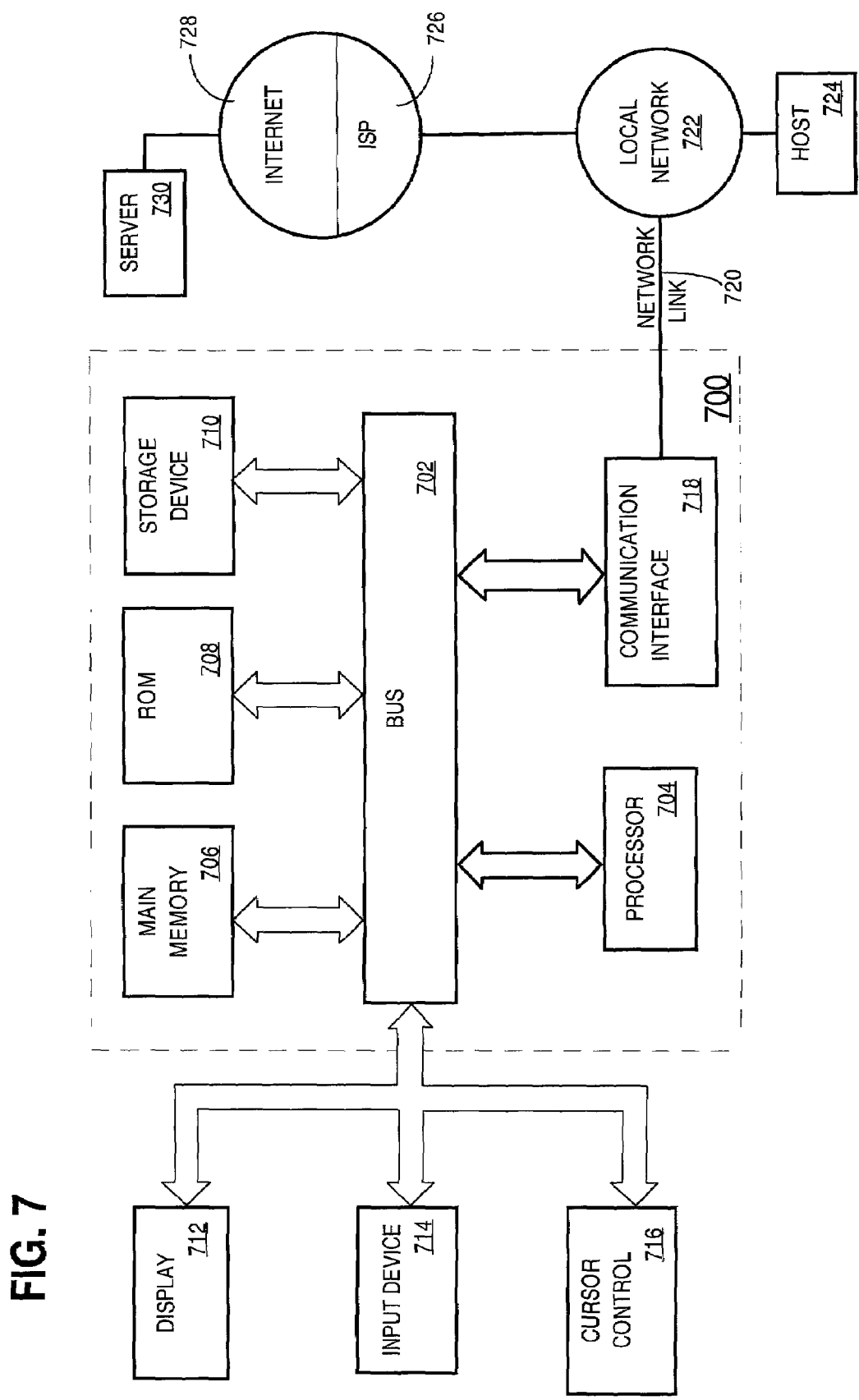
FIG. 7 is a block diagram of a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing an atomic transaction that involves a first plurality of operations that causes changes to a first set of data, the method comprising the steps of:
   performing a first operation of said first plurality of operations associated with the atomic transaction;
   during said step of performing the first operation, detecting a first error that prevents completion of the first plurality of operations;
   in response to detecting the first error, performing a second plurality of operations for resolving the first error;
   determining whether a resolution of the first error is obtained in response to performing the second plurality of operations; and
   if the resolution is obtained, then resuming execution of the first plurality of operations.

2. The method of claim 1, wherein:
   the step of determining whether the resolution is obtained includes determining whether the resolution is obtained within a particular time period; and
   the method further comprises the step of, if the resolution is not obtained within said particular time period, then performing a third plurality of operations to remove all changes made by the atomic transaction to said first set of data.

3. The method of claim 1, wherein:
   the method further comprises the step of determining whether the first error is a member of a predetermined set of errors for which corrective action is available for allowing the atomic transaction to be completed; and
   said step of performing the second plurality of operations is initiated upon determining that the first error is a member of the predetermined set of errors.

4. The method of claim 1, wherein:
   the method further comprises the step of detecting that the first error indicates a lack of sufficient resources to complete said atomic transaction; and
   the step of performing the second plurality of operations includes performing operations directed to obtaining additional resources.

5. The method of claim 4, wherein the step of performing operations directed to obtaining additional resources includes inviting human intervention to supply the additional resources.

6. The method of claim 4, wherein the additional resources include at least one of durable storage space, memory, processors, and communication bandwidth.

7. The method of claim 4, wherein the additional resources include at least one of:
   storage space for a database associated with said first set of data; and
   storage space for storing undo information that indicates how to undo said changes to said first set of data.

8. The method of claim 1, wherein:
   said step of performing the first operation further comprises the step of requesting a first resource by calling a first instance of a service; and
   said steps of detecting the first error, performing the second plurality of operations, and determining whether the resolution is obtained are performed by the first instance of the service.

9. The method of claim 8, further comprising requesting a second resource during said requesting the first resource by calling a second instance of the service.

10. The method of claim 9, further comprising the second instance performing the steps of:
    detecting the first error; and
    passing data indicating the first error to the first instance.

11. The method of claim 10, further comprising the second instance performing the step of aborting the request for the second resource in response to detecting the first error.

12. The method of claim 1, wherein the step of performing the second plurality of operations includes performing an operation that suspends execution of remaining operations of the first plurality of operations.

13. The method of claim 1, wherein the step of performing the second plurality of operations includes releasing all locks held on all resources as a result of the first operation.

14. A method for handling a call that requests a resource in a computer system, the method comprising the steps of:
 receiving said call at a first instance of a service;
 in response to said call, performing the steps of
  adding to a data structure data indicating a first pending request for a first resource;
  requesting the first resource;
  determining whether a first error occurs during said requesting the first resource; and
  if the first error occurs, then
   determining whether data indicating a second pending request for a second resource precedes the data indicating the first pending request in the data structure, and
   if the data indicating the second pending request precedes the data indicating the first pending request, then responding to said call with data indicating the first error.

15. The method of claim 14 wherein said step of requesting the first resource comprises the steps of:
 determining whether providing the first resource depends upon obtaining a second resource; and
 if providing the first resource depends upon obtaining the second resource, then calling a second instance of the service to provide the second resource.

16. The method of claim 15, further comprising, if providing the first resource does not depend upon obtaining the second resource, then performing the step of requesting the first resource from an operating system.

17. The method of claim 14 further comprising, if the first error is not detected, then performing the step of responding to said call with data indicating a reference for the first resource.

18. The method of claim 14, further comprising, if no data indicating the second pending request precedes the data indicating the first pending request, then performing the steps of:
 performing a plurality of operations for resolving the first error;
 determining whether a resolution of the first error is obtained in response to performing the plurality of operations; and
 if the resolution is obtained, then responding to said call with data indicating a reference for the first resource.

19. The method of claim 18, further comprising, if the resolution is not obtained, then performing the step of responding to said call with data indicating the first error.

20. The method of claim 14, further comprising removing the data indicating the first pending request from the data structure before returning control to a routine that made the call to the first instance of the service.

21. The method of claim 14, further comprising the step of de-allocating the data structure in response to determining that the data structure does not include at least one pending request.

22. A method for executing an atomic transaction that involves a first plurality of operations that causes changes to a first set of data, the method comprising the steps of:
 performing a first operation of said first plurality of operations associated with the atomic transaction;
 during said step of performing the first operation, detecting a first error that prevents completion of the first plurality of operations;
 determining whether the first error is a member of a predetermined set of errors for which corrective action is available for allowing the atomic transaction to be completed; and
 upon determining that the first error is a member of the predetermined set of errors, performing a second plurality of operations for resolving the first error, including
  releasing all locks held on all resources as a result of the first operation, and
  performing an operation that suspends execution of remaining operations of the first plurality of operations;
 determining whether a resolution of the first error is obtained within a particular time period in response to performing the second plurality of operations;
 if the resolution is obtained, then resuming execution of the first plurality of operations; and
 if the resolution is not obtained within said particular time period, then performing a third plurality of operations to remove all changes made by the atomic transaction to said first set of data.

23. The computer-readable storage medium carrying instructions for executing an atomic transaction that involves a first plurality of operations that causes changes to a first set of data, the instructions for causing one or more processors to perform the steps of:
 performing a first operation of said first plurality of operations associated with the atomic transaction;
 during said step of performing the first operation, detecting a first error that prevents completion of the first plurality of operations;
 in response to detecting the first error, performing a second plurality of operations for resolving the first error;
 determining whether a resolution of the first error is obtained in response to performing the second plurality of operations; and
 if the resolution is obtained, then resuming execution of the first plurality of operations.

24. The computer-readable storage medium of claim 23, wherein:
 the step of determining whether the resolution is obtained includes determining whether the resolution is obtained within a particular time period; and
 the instructions further cause the one or more processors to perform the step of, if the resolution is not obtained within said particular time period, then performing a third plurality of operations to remove all changes made by the atomic transaction to said first set of data.

25. The computer-readable storage medium of claim 23, wherein:
 the instructions further cause the one or more processors to perform the step of determining whether the first error is a member of a predetermined set of errors for which corrective action is available for allowing the atomic transaction to be completed; and
 said step of performing the second plurality of operations is initiated upon determining that the first error is a member of the predetermined set of errors.

26. The computer-readable storage medium of claim 23, wherein:

the instructions further cause the one or more processors to perform the step of detecting that the first error indicates a lack of sufficient resources to complete said atomic transaction; and the step of performing the second plurality of operations includes performing operations directed to obtaining additional resources.

27. The computer-readable storage medium of claim 26, wherein the step of performing operations directed to obtaining additional resources includes inviting human intervention to supply the additional resources.

28. The computer-readable storage medium of claim 26, wherein the additional resources include at least one of durable storage space, memory, processors, and communication bandwidth.

29. The computer-readable storage medium of claim 26, wherein the additional resources include at least one of:

storage space for a database associated with said first set of data; and storage space for storing undo information that indicates how to undo said changes to said first set of data.

30. The computer-readable storage medium of claim 23, wherein:

said step of performing the first operation further comprises the step of requesting a first resource by calling a first instance of a service; and said steps of detecting the first error, performing the second plurality of operations, and determining whether the resolution is obtained are performed by the first instance of the service.

31. The computer-readable storage medium of claim 30, the instructions further cause the one or more processors to perform requesting a second resource during said requesting the first resource by calling a second instance of the service.

32. The computer-readable storage medium of claim 31, the instructions further cause the second instance to cause the one or more processors to perform the steps of:

detecting the first error; and passing data indicating the first error to the first instance.

33. The computer-readable storage medium of claim 32, the instructions further cause the second instance to cause the one or more processors to perform the steps of aborting the request for the second resource in response to detecting the first error.

34. The computer-readable storage medium of claim 23, wherein the step of performing the second plurality of operations includes performing an operation that suspends execution of remaining operations of the first plurality of operations.

35. The computer-readable storage medium of claim 23, wherein the step of performing the second plurality of operations includes releasing all locks held on all resources as a result of the first operation.

36. A computer-readable storage medium carrying instructions for handling a call that requests a resource in a computer system, the instructions causing one or more processors to perform the steps of:

receiving said call at a first instance of a service;

in response to said call, performing the steps of adding to a data structure data indicating a first pending request for a first resource;

requesting the first resource;

determining whether a first error occurs during said requesting the first resource; and if the first error occurs, then determining whether data indicating a second pending request for a second resource precedes the data indicating the first pending request in the data structure, and if the data indicating the second pending request precedes the data indicating the first pending request, then responding to said call with data indicating the first error.

37. The computer-readable storage medium of claim 36, wherein said step of requesting the first resource comprises the steps of:

determining whether providing the first resource depends upon obtaining a second resource; and if providing the first resource depends upon obtaining the second resource, then calling a second instance of the service to provide the second resource.

38. The computer-readable storage medium of claim 37, the instructions further causing the one or more processors to perform the step of, if providing the first resource does not depend upon obtaining the second resource, then requesting the first resource from an operating system.

39. The computer-readable storage medium of claim 36, the instructions further causing the one or more processors to perform the step of, if the first error is not detected, then responding to said call with data indicating a reference for the first resource.

40. The computer-readable storage medium of claim 36, further comprising, if no data indicating the second pending request precedes the data indicating the first pending request, then performing the steps of:

performing a plurality of operations for resolving the first error;

determining whether a resolution of the first error is obtained in response to performing the plurality of operations; and if the resolution is obtained, then responding to said call with data indicating a reference for the first resource.

41. The computer-readable storage medium of claim 40, the instructions further causing the one or more processors to perform the step of, if the resolution is not obtained, then responding to said call with data indicating the first error.

42. The computer-readable storage medium of claim 36, the instructions further causing the one or more processors to perform the step of removing the data indicating the first pending request from the data structure before returning control to a routine that made the call to the first instance of the service.

43. The computer-readable storage medium of claim 36, the instructions further causing the one or more processors to perform the step of de-allocating the data structure in response to determining that the data structure does not include at least one pending request.

* * * * *

UNITED STATES PATENT AND TRADEMARK OFFICE
CERTIFICATE OF CORRECTION

PATENT NO. : 6,961,865 B1
DATED : November 1, 2005
INVENTOR(S) : Amit Ganesh et al.

It is certified that error appears in the above-identified patent and that said Letters Patent is hereby corrected as shown below:

Column 24,
Line 26, delete "The computer-readable storage medium carrying instructions for executing" and insert -- A computer-readable storage medium carrying instructions for executing --.

Signed and Sealed this

Seventeenth Day of January, 2006

JON W. DUDAS
*Director of the United States Patent and Trademark Office*